United States Patent [19]
Kraus

[11] Patent Number: 6,039,523
[45] Date of Patent: Mar. 21, 2000

[54] ADJUSTABLE CONNECTOR SYSTEM

[75] Inventor: Willibald Kraus, Grünstadt, Germany

[73] Assignee: TRW Automotive Electronics & Components GmbH & Co. KG, Germany

[21] Appl. No.: 09/204,997

[22] Filed: Dec. 2, 1998

[30] Foreign Application Priority Data

Dec. 3, 1997 [DE] Germany .................. 197 53 678

[51] Int. Cl.$^7$ ..................... F16B 13/06; F16B 19/00
[52] U.S. Cl. ................. 411/48; 411/60.1; 411/508; 411/908
[58] Field of Search ................. 411/41, 45, 48, 411/338, 339, 508, 509, 510, 60.1, 908

[56] References Cited

U.S. PATENT DOCUMENTS

| | | | |
|---|---|---|---|
| 4,861,208 | 8/1989 | Boundy | 24/297 X |
| 4,874,276 | 10/1989 | Iguchi | 24/297 X |
| 5,387,065 | 2/1995 | Sullivan | 411/48 |
| 5,641,255 | 6/1997 | Tanaka | 411/48 |

*Primary Examiner*—Neill Wilson
*Attorney, Agent, or Firm*—Fay, Sharpe, Fagan, Minnich & McKee, LLP

[57] ABSTRACT

An adjustable connector system is provided between a support (2), specifically a body part of a motor vehicle and a plate element, specifically a door covering. The connector system includes a connector member having with an upper portion (3) attachable to the plate element and a lower portion (4) connectable with the support (2). Between upper piece (3) and lower piece (4) there is provided a neck-shaped intermediary region (5), fitted with locking elements (10). An anterior region of the intermediary region is adapted to traverse an engagement piece (12) embeddable in a support opening (7). Interference between the intermediary region and the engagement piece urges the intermediary region to spread radially outwardly behind the support opening (7).

49 Claims, 12 Drawing Sheets

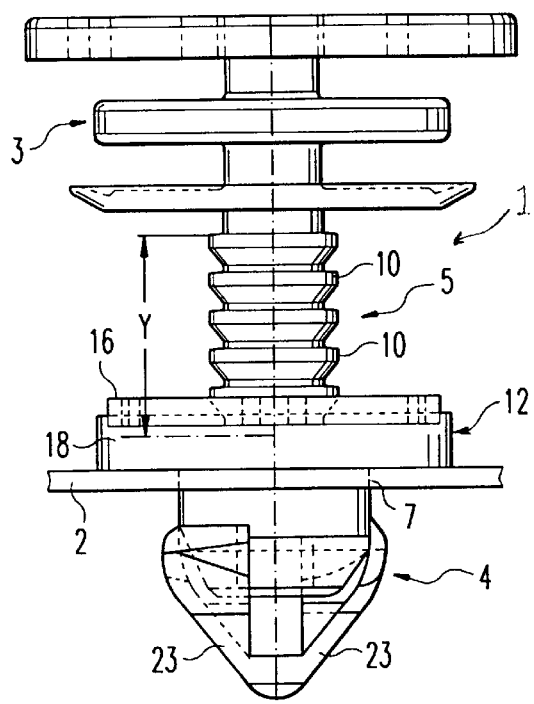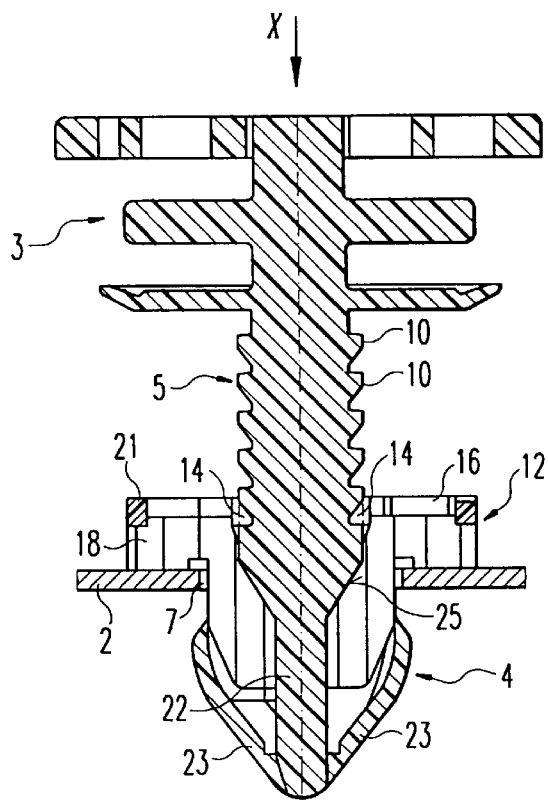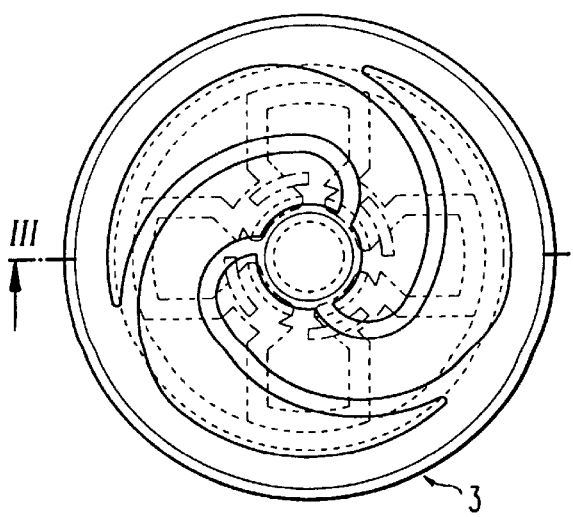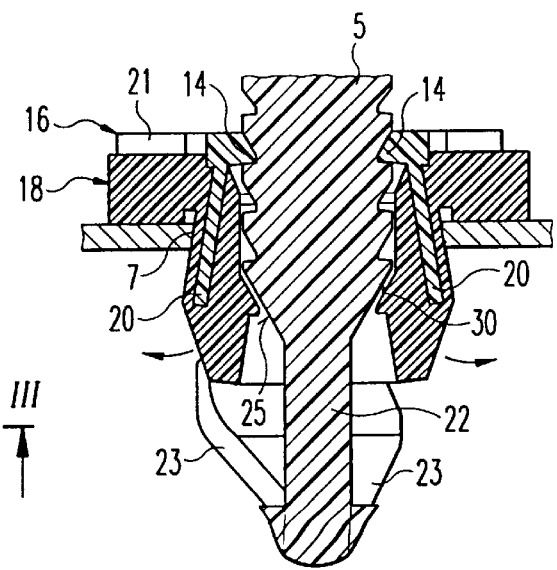
Fig. 1
Fig. 3
Fig. 2
Fig. 4

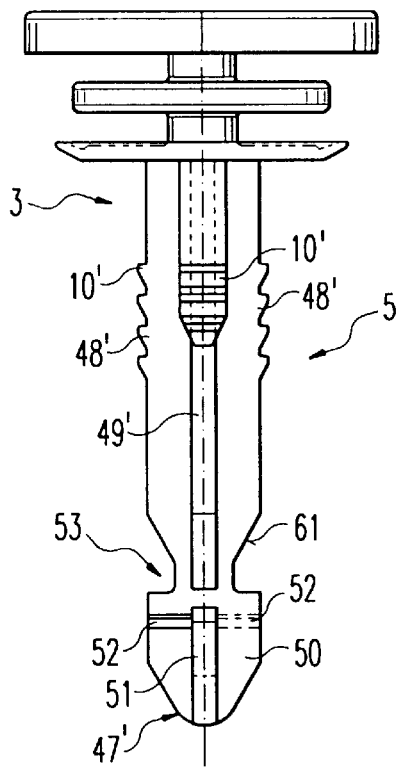
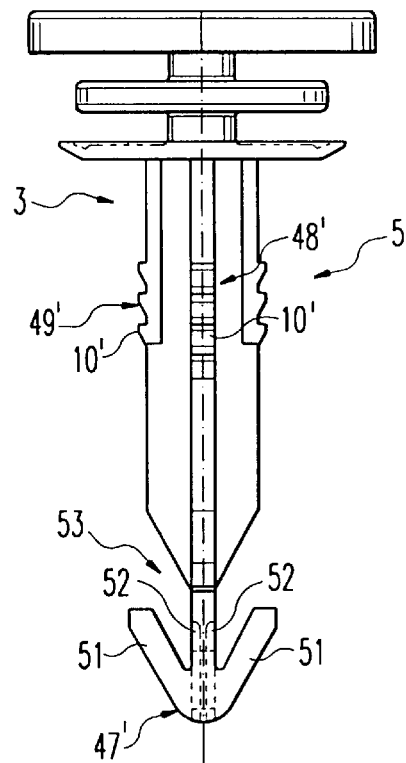
Fig. 23　　　　Fig. 24
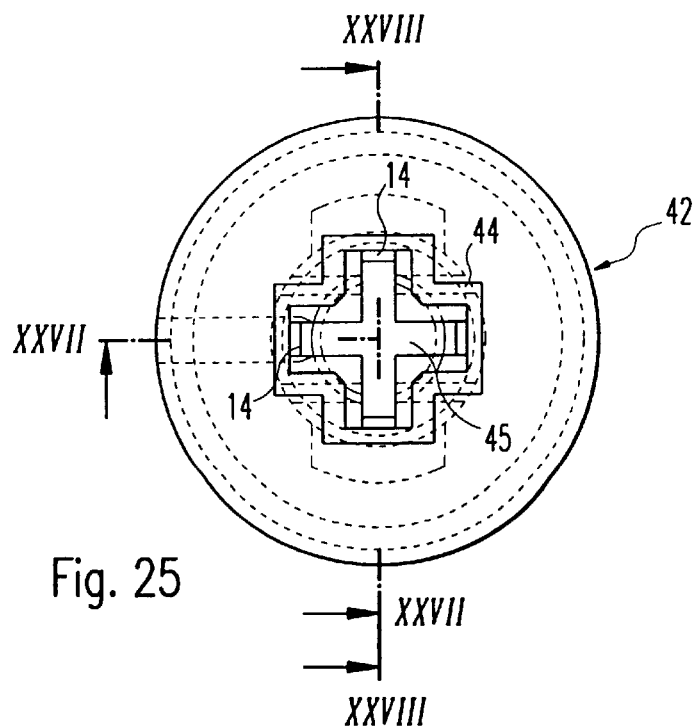
Fig. 25

ADJUSTABLE CONNECTOR SYSTEM

BACKGROUND OF THE INVENTION

The subject invention is directed to the fastener art and, more particularly, to an adjustable connection system of the type used to hold a plate element to a support member.

Connectors of the type under consideration are commonly used in the automotive vehicle art to provide an adjustable connection between a door covering member and an automotive body part. Typically, an upper portion of the connector assembly is attached to a plate element such as a door covering and a lower portion of the connector assembly is attached to the support member such as, for example, an automotive body part. The subject connector assembly, however, is adjustable so that the relative distance between the door covering and body part can be selected at the time the fastener is installed.

One such basic non-adjustable connection element is described in European Patent Application EP 0 726 401 A1 whereat a connector is shown having a pair of flanges located above a circumferentially arranged second flange having elastic properties different from the pair of flanges. In that system, the pair of flanges can be inserted laterally into pockets formed in a contact zone of an upper part. A lower sealing lip is adapted to act upon an upper zone of a support when the system is in a mounted state to thereby produce an somewhat tight connection.

Further, the state of the art includes an element having an upper part that is attachable to a plate element, a center part, and a specialized holding element. Such a connection is shown in published German Patent Application DE 40 14 589 C1. The construction of the connector shown in that application enables mounting tolerance compensation that is especially useful in the motor vehicle industry. However, the tolerance compensation is enabled only in a plane extending parallel to the support member.

Fasteners of the type described above for connecting motor vehicle door covering devices to automotive body parts have caused some assembly problems. In particular, the devices described above do not permit adjustment between the spacing between the door covering and the body panel support members.

It would be desirable, therefore, to provide an adjustable connector system to hold a plate element in a spaced-apart relationship relative to a support member.

SUMMARY OF THE INVENTION

The subject invention provides a new and improved adjustable connector system and construction which overcomes the above-noted problems and results in a connector assembly with spacing tolerance compensation encompassing a region as large as possible and in multiple axes in the motor vehicle.

In particular, and in accordance with one aspect of the invention, an intermediary neck-shaped region is provided between upper and lower parts or portions of a connector. The intermediary neck-shaped region is fitted with a plurality of locking elements which traverse, in an anterior region of the connector, into an engagement piece adapted for embedded connection in an operatively associated support opening. The selectively embeddable engagement piece expands behind the support opening as the neck-shaped region is inserted therethrough. At least one counter-locking element disposed on the engagement piece is adapted to selectively engage the plurality of locking elements disposed on the intermediary neck-shaped member. By the interaction of the locking elements of the neck-shaped intermediary region and the counter-locking elements provided on the engagement piece, a tolerance compensation is provided over a large region across a transverse axis, or "Y-axis", of the motor vehicle. The transverse axis extends crosswise to the driving direction such, i.e. from the driver door to the passenger door. As a result of the ability of the intermediary region to traverse the engagement piece and spread the engagement piece radially outwardly behind the door opening, the present invention provides assurance of secure and sealed attachment of the connection piece to the motor vehicle support member.

In accordance with another aspect of the invention, the engagement piece or member of the present invention is formed from two materials. The thus formed two-component part is designed to include a holding element consisting of a first hard material and an embedding element consisting of a second and softer material. Preferably, both materials are synthetic materials such as, for example, the hard material being PA type material and the soft material being TPE material. Using a blend of materials, only a small press-in force is required in order to embed the intermediary piece into the contact piece to guarantee a tight sealing. In addition to the above, because the counter-locking pieces embed themselves into the locking elements, a extremely high withdrawal force is needed to extract the intermediary region from the engagement member. Overall, therefore, a highly effective connection element results.

According to yet another aspect of the invention, the holding element is at least partially embedded into the embedding element. Further, the holding element so formed includes a cross-piece which is adapted to embed itself into the embedding element consisting of a softer material.

Still further in accordance with the invention, the holding element can be formed to include four opposing cross-pieces formed adjacent a cross-like designed end region which is embedded in the embedding element. The cross-like designed end regions include at least two counter-locking elements. The locking elements may respectively be located in the regions between two cross-beams, so that, for example, four counter-locking elements exist which can embed themselves into one of the locking elements.

According to yet another aspect of the invention, the intermediary region is designed to have a cylindrical end portion. The cylindrical end portion is located between the at least two diagonally extending resilient guidance wings and a cone. The cone is adapted to mechanically act upon an interior wall of the engagement piece to radially spread open the engagement piece to engage behind the support opening. The guidance wings may, in one embodiment, protrude from the engagement piece and thus provide an excellent mounting aid during installation of the connection element into the support opening.

In accordance with yet another aspect of the invention, the holding element provided with the counter-locking element includes a circumferential inner recess which is adapted to receive the embedding element. Moreover, the resilient counter-locking elements can be located above the recess such as, for example, at the cross-pieces. In this arrangement, several cross-pieces can be disposed diagonally opposite from each other.

In accordance with yet another aspect of the invention, the embedding element consists of a ring embedded in the recess and a spreader element connected therewith, whereby the spreader element takes on an annular shape. During use of the subject adjustable connector system, prior to final installation in the support, the spreader element can be embedded in a groove of the intermediary region and does not impede the installation process. More particularly, the spreader element is embeddable in the groove of the intermediary region to not impede the insertion of the connection according to the invention into a support opening. It is only when under the influence of pressure caused by the intermediary piece pressed into engagement with the engagement piece that the spreader element is forced out of the groove and embeds itself, in an expanded form, behind the support opening. Since the embedding element itself consists of a softer material, an overall improved excellent sealing effect is assured.

In still yet another aspect of the invention, the inner recess of the holding element has an inverted U shape and has, on a side facing the intermediary region, a leg member penetrating the support opening. The front side of the leg is adapted to embed itself jointly with the spreader element into the groove of the intermediary region. Furthermore, in accordance with this aspect of the invention, the front side of the leg is adapted to embed itself in a circumferential recess of the spreader element. In such an arrangement, the groove of the intermediary region may be followed, in the front, by a guidance cone which is preferably designed, for example, to have a cross section taking on the form of a cross. This shape also results in an easier insertion of the connection element formed in accordance with the present invention into an associated support opening.

In accordance with a further aspect of the invention, the holding element is formed to have a profile region which is embeddable into the embedding element. Alternatively, the holding element is designed in the form of a ring embedded, at least partially, within the embedding element, where at least one portion of the holding element forms a protruding region that simultaneously forms a counter catch.

In yet another aspect of the invention, the upper part of the connection member has an intermediary region which includes a plurality of longitudinally extending cross-pieces formed at an outer circumference thereof. The cross-pieces are fitted at their front faces with at least one locking element. In this aspect of the invention, the lower part of the connector assembly includes a housing with a recess adapted to take on the shape of the cross section of the plurality of longitudinally extending cross-pieces formed on the upper part. The inside of the housing is fitted with at least one counter-catch for engagement with the plurality of locking elements formed on the faces of the cross-pieces on the upper part. A pair of cross-pieces are formed to face each other diagonally, whereby the cross-pieces have different widths. A single cross piece may also have various widths, whereby the locking elements are preferably arranged on the cross-piece area having widths corresponding to the widths of the faces of the single cross-pieces. In that case, the housing has a cross section with different widths adapted to receive the longitudinally extending cross-pieces.

In still yet another aspect of the invention, the cross pieces may be bounded on their ends by a conically tapering insertion area. The insertion area may, for example, be equipped with at least two diagonally opposite, resilient stop lugs.

In accordance with yet another aspect of the invention, the intermediary region between the cross-pieces and the insertion area haves contraction area.

The housing of the upper part may, in another aspect of the invention, have at least one longitudinally extending slot connecting with the recess. There, preferably, several slots may be formed to extend on at least one surface and/or at least one lateral edge of the housing.

In accordance with yet a further aspect of the invention, the lower part of the adjustable connector system can be formed as a two-component part and therefore be formed to have an area made of a first hard material including the housing and an upper part of the sealing flange and an area made of a second and softer material including a lower portion of the sealing flange and at least one spreader element extending through the support opening. The spreader elements can be expandable behind the support opening via the intermediary region of the upper part of the adjustable connector system.

In accordance with yet a further aspect of the invention, an area formed below the sealing flange can be made of the second softer material and can be provided with at least two catches which are selectively embeddable in the contraction area of the intermediary area. Following insertion movement of the upper part into the lower part, the at least two catches are spreadable behind the support opening urged thereby means sloping surfaces provided on the intermediary region above the contraction area.

In yet another aspect of the invention, the lower part above the sealing flange can be provided with several opposed facing cross-pieces which are respectively fitted on the inside thereof with counter-catches which are adapted to engage corresponding locking elements formed on the intermediary region.

Alternatively, in another embodiment of the invention, the lower part is formed from two materials. The thus formed two-component part includes a region formed of a hard material, the region including the cross-pieces, and upper part of the sealing flange, and the spreader elements adapted to extend through the support opening. A region made of a second and softer material includes a lower part of the sealing flange.

In yet another aspect of the invention, the lower part is formed to include a region formed of a softer material disposed between two regions of a harder material. The lower part is provided with a circumferential sealing lip.

The upper part of the intermediary region can be formed to have selective different diverse configurations such as, for example, a configuration including a tubing connection, a cable clamp region, and a holding element connection region.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein:

FIG. 1 is a lateral plan view of an adjustable connector system formed in accordance with a first preferred embodiment of the invention;

FIG. 2 is a top plan view of the adjustable connector system illustrated in FIG. 1;

FIG. 3 is a cross-sectional view of the subject adjustable connector system taken along line III—III of FIG. 2;

FIG. 4 is a cross-sectional view taken along line III, III of FIG. 2 illustrating the subject adjustable connector system in a final installed state, partially refracted;

FIG. 23 is a lateral plan view of an upper part of an adjustable connector system formed in accordance with an alternative preferred embodiment;

FIG. 24 is an illustration of the upper part of the adjustable connector system shown in FIG. 23, but turned by 90 degrees;

FIG. 25 is a top plan view of a lower part of the subject adjustable connector system adapted to accept and receive the upper part of the connector system illustrated in FIGS. 23 and 24;

DETAILED DESCRIPTION OF THE PREFERRED EMBODIMENTS

Figure 5:
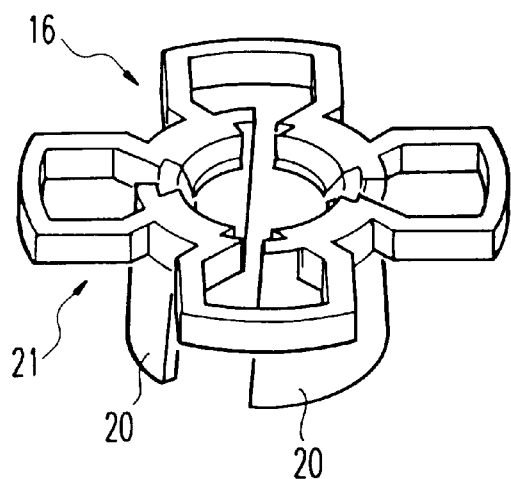
FIG. 5 is a perspective partial view of a first embodiment of a holding element comprising the adjustable connector system of the present invention.

Referring now to the drawings wherein the showings are for the purposes of illustrating the preferred embodiments of the invention only and not for purposes of limiting same, FIG. 1 shows an adjustable connector system formed in accordance with a first preferred embodiment of the invention. The Figure shows a connection 1 adapted to connect a support 2 such as a body part of a motor vehicle to a plate element (not shown) such as an automotive door covering member. The connection 1 includes an upper portion 3 that is adapted for selective attachment to the plate element, and a lower portion 4 that is adapted for selective connection to the associated support 2. The upper portion 3 may take on any desired shape. In the preferred embodiment illustrated, however, the upper portion includes three flanges. The uppermost flange includes a plurality of spirally extending ribs such as shown best in FIG. 2.

As is apparent from FIGS. 1 and 3, a neck-shaped intermediary region 5 is disposed between the upper portion 3 and the lower portion 4. The intermediary region 5 is provided with a plurality of locking elements 10 as illustrated. The locking elements 10 may, for example, be formed as circumferential rings, saw-tooth-shaped threaded regions, hook-like structures, or the like.

As best shown in FIG. 3, the intermediary region includes an anterior region that is adapted to traverse into an engagement member 12 during installation of the subject adjustable connector system. The engagement member 12 is selectively embeddable into a support opening 7 and is adapted to expand behind the support opening when the intermediary region is received in the engagement member. The final or assembled state of the subject adjustable connector system is best illustrated in schematic section in FIG. 4. As best illustrated in FIGS. 3 and 4, the engagement member 12 includes at least one counter-locking unit 14 that is selectively embeddable in the locking elements 10. In that way, the intermediary region 5 can be selectively adjusted relative to the engagement piece 12 to enable a range of spacing between the upper portion 3 and the engagement piece 12 as illustrated at Y in FIG. 1.

It is preferred that the engagement member be formed from two materials as a two-component part. As best represented in sectional view in FIGS. 3 and 4, the engagement member 12 includes a holding element 16 consisting of a hard plastic and by an embedding element 18 consisting of a softer plastic material. The holding element 16 includes a plurality of counter-locking units 14. As shown, the counter-locking units are adapted to engage the plurality of locking elements 10 formed on the intermediary region 5.

Figure 6:
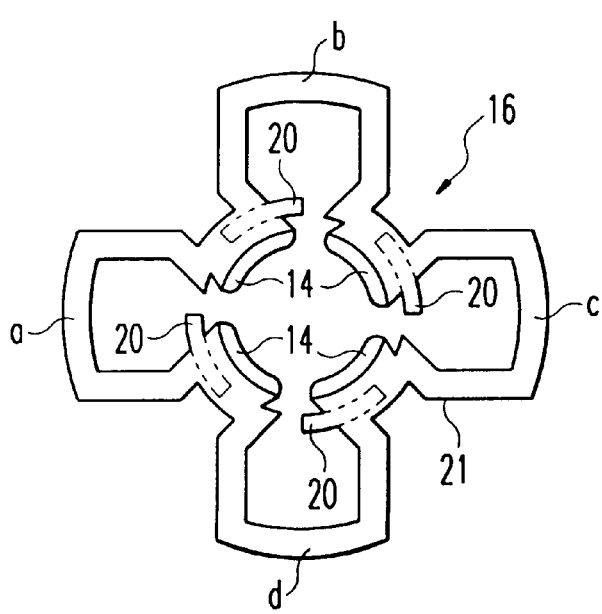
FIG. 6 is a top plan view of the holding element illustrated in FIG. 5.

A first preferred embodiment of the holding element 16 is shown in FIGS. 5 and 6. Turning now to those figures, the holding element preferably includes four diagonally opposite cross-piece members 20 which are formed embedded within the embedding element 18, according to FIG. 4. Preferably, arranged adjacent the cross-pieces 20, there are disposed, superior thereto, a cross-like designed end region fitted, according to FIG. 5, with counter-locking elements 14. The counter-locking elements may be respectively located between the regions between pairs of cross-beams a, b, c, and d as is specifically shown in FIGS. 5 and 6. The cross-beams are preferably designed in the form of thin cross-pieces and thus have a predetermined elasticity. The cross-pieces, according to FIG. 6, preferably protrude into the space between the cross-beams a, b, c, and d.

Thus, in the embodiment illustrated in FIGS. 3 and 4, the holding element 16 is largely embedded entirely within the embedding element 18, consisting of a material softer than the material forming the holding element.

Figure 7:
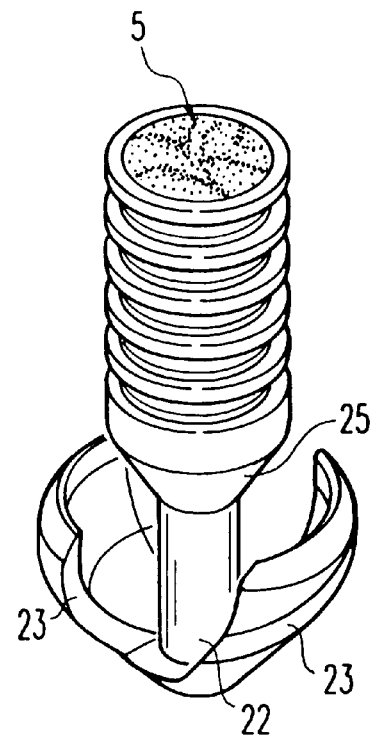
FIG. 7 is a perspective partial view of an intermediary region of the first embodiment of the invention shown in FIG. 1.
Figure 8:
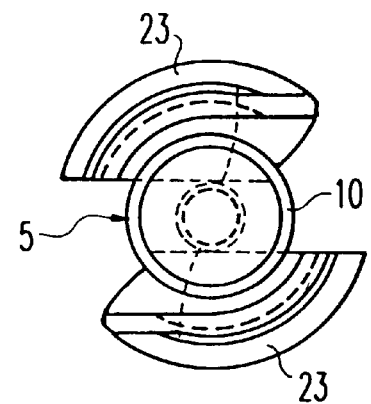
FIG. 8 is a bottom plan view of the intermediary region shown in FIG. 7.

The lead end of the intermediary region 5 is shown in FIGS. 7 and 8. A cylindrical member 22 is formed on the intermediary region as illustrated and carries at least two resilient guidance wings 23. The guidance wings extend diagonally outwardly from the cylindrical member 22. A cone or conical surface 25 is formed on the intermediary region 5 between the plurality of locking elements 10 and the cylindrical member 22. The conical surface 25 is adapted to engage and press on an interior wall 30 of the engagement member 12. In this relationship as shown in FIG. 4, the guidance wings 23 protrude outwardly beyond the engagement member 12. The pair of guidance wings thus comprise an installation aid, in order to insert, for example, according to FIG. 5, the connection according to the invention into the associated support opening 7. However, it is also possible to utilize, for example, several guidance wings which are separated from each other by slots. In that example, the guidance wings preferably have obliquely extending ramps in order to facilitate insertion into the support opening.

During installation of the subject connector system, when pressing the connection 1 into the support opening 7, the wings 23 press upon the lower region of the embedding element 18, consisting of softer material and thereby compress the embedding element. This results in a very favorable installation into the associated support opening 7. When the position shown in FIG. 3 has been reached, the elastic wings 23 spread diagonally outwardly. At that point, the possibility then exists of moving the cone 25 by means of pressure in the direction of arrow X, according to FIG. 3, so that the engagement member 12, consisting of holding element 16 and embedding element 18, is spread out and thereby clamps itself in the anterior region behind the opening 7 of the support 2 as best shown in FIG. 2. At the same time, the counter-locking units 14 of the holding element consisting of hard material embed themselves in the corresponding locking elements 10 within a tolerance range Y according to FIG. 1. This permits, overall in the Y direction, excellent tolerance compensation in the spacing between the support 2 and the operatively associated support or plate element (not shown. The plate element can embed itself, for example, according to FIG. 2, in the upper portion 3 consisting of three disks via pockets (not shown), or the like. This guarantees a secure connection with the support member 2 in a functionally-correct position.

Since the embedding element 18 is formed of a softer material than the holding element 16, the softer material fully traverses the support opening 7 as shown in FIG. 4 and embeds itself in front or behind same and further guarantees in a simple manner, a watertight covering of the support opening 7.

Figure 9:
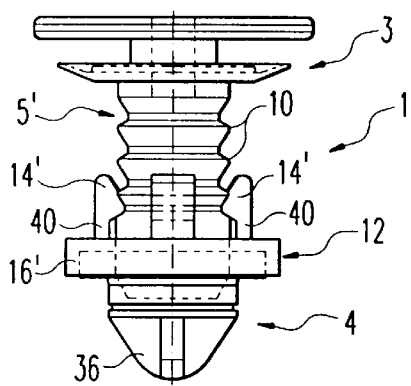
FIG. 9 is a lateral plan view of an adjustable connector system formed in accordance with a second preferred embodiment of the invention.
Figure 10:
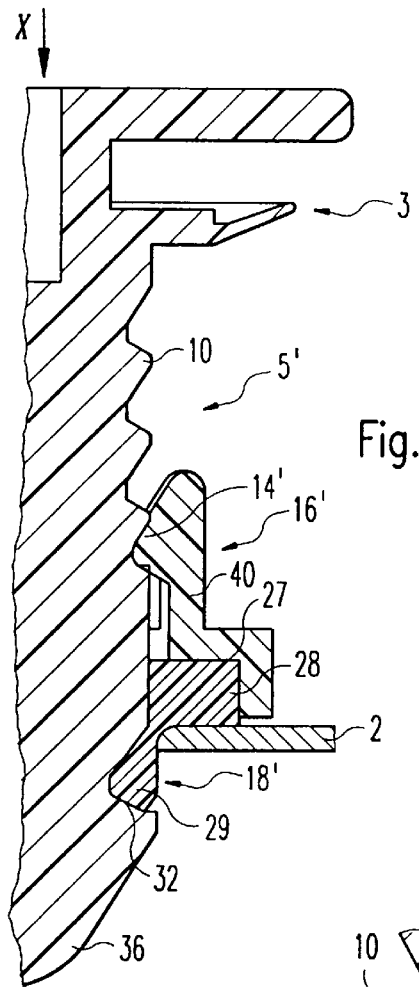
FIG. 10 is a partial sectional view of the adjustable connector system shown in FIG. 4 and illustrated in a pre-assembled state after initial insertion into an operatively associated support opening.

Referring now to FIGS. 9 and 10, a second preferred embodiment of the subject adjustable connector system is illustrated. In those figures and as best shown in FIG. 10, the holding element, 16' defines a circumferential inner recess 27. In this embodiment, the embedding element 18' embeds itself within the recess 27. The embedding element 18' is, for example, formed of a ring 28 and a spreader element 29 connected integrally with the ring 28. The spreader element 29 can be designed in the shape of an annulus and is preferably adapted to be embedded within a groove 32 formed in the intermediary region 5' prior to installation of the subject adjustable connector system in an associated support opening 7. Further, as shown in FIG. 10, in the subject embodiment, the resilient counter-locking units 14" are disposed on the holding element 16 carried by a plurality of cross-pieces 40. These cross-pieces 40 are arranged to oppose each other diagonally as shown best in FIG. 9.

As can be seen from FIGS. 9 and 10, the lead end of the intermediary region 5' includes a groove 32 and a guidance cone region 36 designed to have a cross sectional shape in the form of a cross which offers a guidance aid during installation of the intermediary region into the holding element. Further, the cross-section formed by the guidance cone 36 aids in installing the subject connector system into the support opening by providing a lead-in profile as best shown in FIGS. 9 and 10.

With reference to FIG. 10, if pressure is again applied in the direction X after preliminary installation of the connection according to the invention in a support opening, the counter-locking units 14' lock in functionally correct positions in the Y direction, whereby, simultaneously, the spreader element 29 is forced out of the groove 32 and positions itself in a radially spread-out manner to engage behind the support opening 7. Accordingly, the intermediary region 5' forces the spreader element 29 radially outwardly and into engagement behind the support member 2 thus locking the holding element 16' in place. The plurality of counter-locking mechanisms 14' in turn hold the intermediary region 5' relative to the holding element 16'.

Figure 11:
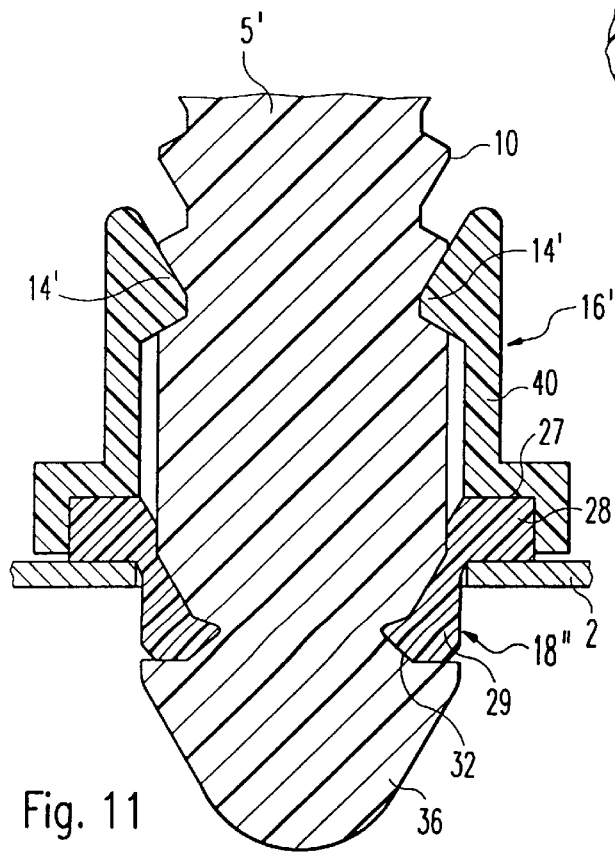
FIG. 11 is a cross-sectional view of the adjustable connector system formed in accordance with an alternative preferred embodiment illustrated after insertion into an operatively associated support opening.

FIG. 11 shows a cross sectional view of another preferred alternative embodiment of the subject invention. As shown there, the spreader element 29 is designed to have a different profile than the spreader element illustrated in FIG. 10. Overall, the spreader element shown in FIG. 11 engages additional volume in the groove 32 formed in the intermediary region 5'.

Figure 12:
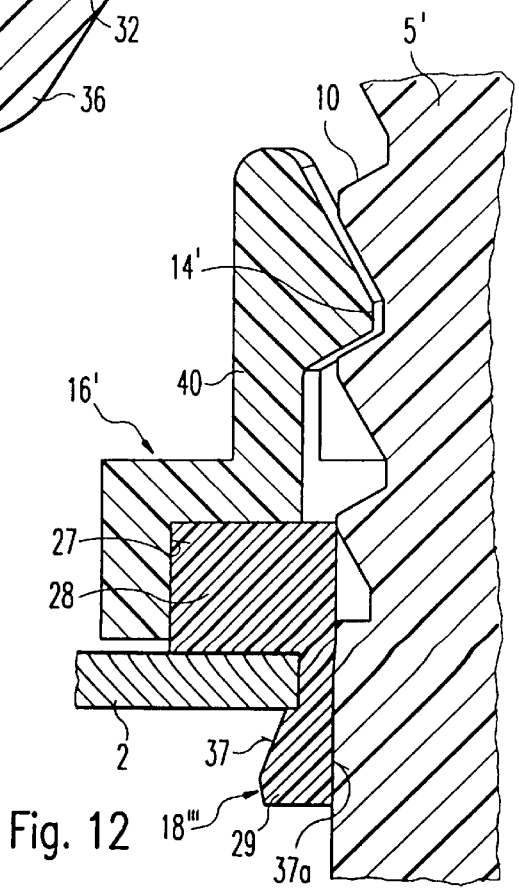
FIGS. 12 and 13 each respectively illustrate alternative embodiments of the latch mechanism used in the subject adjustable connector system in cross section and after final installation into a support opening.

Turning now to FIG. 12, yet another alternative preferred embodiment of the invention is illustrated. As shown there, no groove 32 is provided in the intermediary member. Rather, the spreader element 29 includes two areas 37 and 37a facing each other at an angle. As a result of this orientation of the two areas facing each other at an angle, a radial spreading action takes place as the intermediary piece 5' is pressed into the holding element 16'. As that happens, the embedding element 18''' is spread radially outwardly to engage behind the support opening 7.

Figure 13:
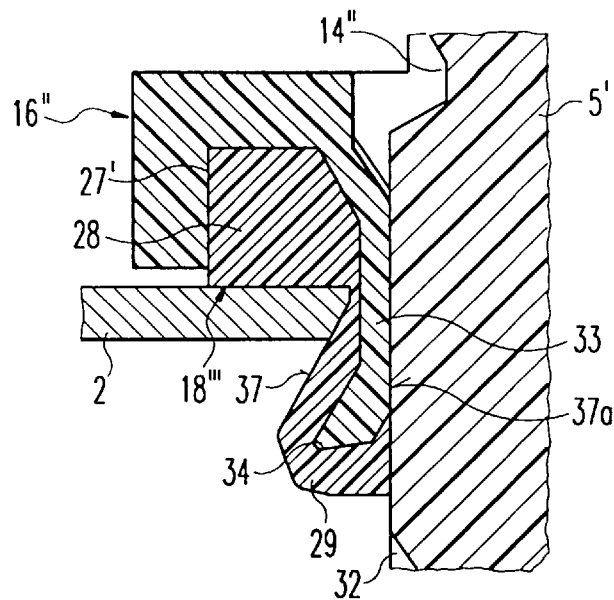
Figure 14:
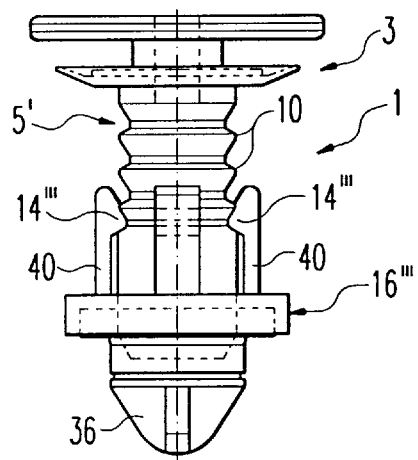
FIG. 14 is a lateral plan view of an embodiment of the subject adjustable connector system shown in FIG. 13.
Figure 15:
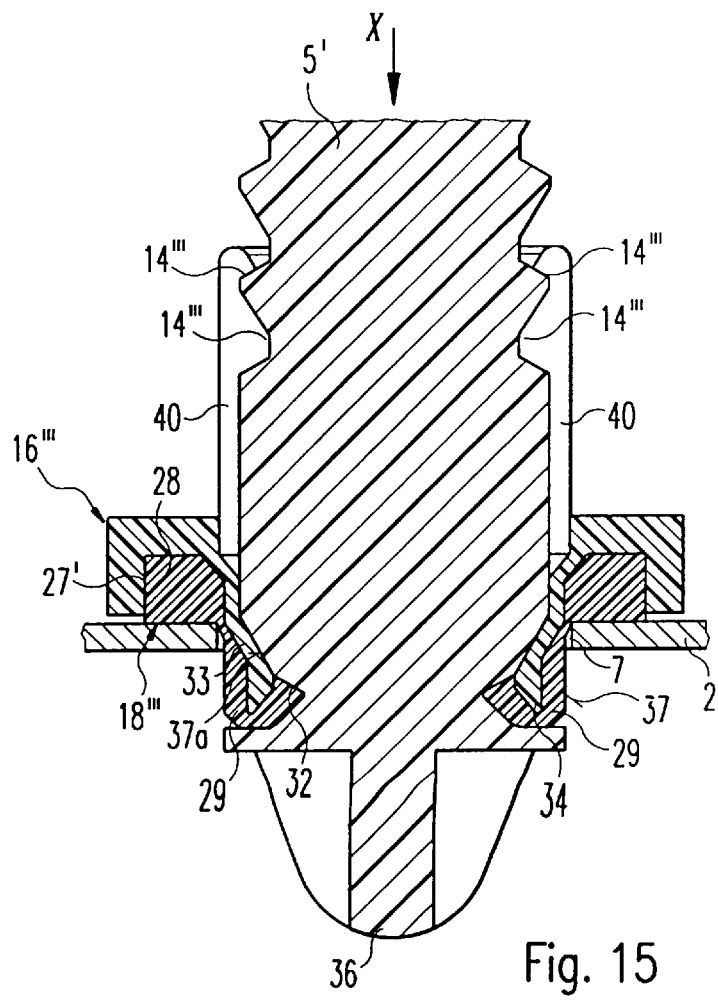
FIG. 15 is cross-sectional view of the alternative preferred embodiment of the subject adjustable connector system shown in FIGS. 13 and 14, illustrated in a pre-mounted state.

In the embodiment illustrated in FIGS. 13–15, the inner recess 17' of the holding element 16" has the shape of an inverted "U" with a leg member 33 disposed at a side thereof facing the intermediary region 5'. The inverted U portion of the holding element penetrates through the support opening 7. In this arrangement, the front side of leg 33 is adapted to embed itself in a recess 34 of the spreader element 29.

Again, analogous to the specific embodiment shown in FIG. 12, the pair of surfaces 37 and 37a are provided in the embodiment illustrated in FIG. 13. The pair of surfaces face each other at an angle, which results in a radially spreading process leading to the final installation state shown in FIG. 13.

FIG. 14 illustrates a plurality of resilient counter-locking units 14''' formed as part of the holding element 16'''. The counter locking units are disposed on cross-pieces 40 as shown. When the connection 1 is installed according to FIG. 15 in the support opening, the leg 33 and the spreader element 29 initially remain within groove 32, resulting in advantageous preinstallation insertion effort. Thereafter, it is possible to exert pressure on the intermediary piece in the direction labeled in the drawing X. As a result of pressure in the X direction, a leg 33 and the spreader element are forced out of the groove 32 with the result of the final installation state or arrangement according to FIG. 3.

Although not illustrated in the drawings, it is possible to provide the holding element with a profile region which is embedded in the embedding element 18. The profile region can be formed, for example, in the shape of un under-cutting, as a result of which the holding element, which is fitted with corresponding counter-locking units, attaches to the embedding element. Furthermore, though not particularly illustrated in the drawings, the holding element can be formed as an at least partially embedded ring within the embedding element, whereby at least one region projects from the embedding element and forms, at the same time, the counter-locking unit. The ring can be formed, for example, so that it consists of an outer annular region, embedded, overall, in the embedding piece. The embedding piece is in turn connected via the cross-pieces with an inner annular region at which are located several other opposing counter-locking units.

With respect to the neck-shaped intermediary configuration, there are also various alternative configurations possible whereby, for example, instead of two guidance rings 23 according to FIG. 7, a conical region may be provided fitted at its posterior end with several parallel extending cross-pieces, or the like.

FIGS. 16–22 illustrate yet another alternative preferred embodiment of the invention. As shown there, the upper portion 3 includes an intermediary region 5 provided with longitudinally extending cross-pieces 48 and 49 at an outer circumference thereof. The cross-pieces have a front face provided with a plurality of locking elements 10' shown best in FIG. 16. The cross-pieces 48 and 49 face each other diagonally, whereby preferably four cross-pieces are provided. The cross-pieces can have various widths such as, for example, in the specific embodiment shown in FIG. 16, cross-pieces 48 have a smaller width than the cross-pieces 49. Cross-pieces 49 converge below the locking elements 10' into a more narrow design or profile. Profile members 58 are disposed at the intersections between the cross-pieces 48 and 49, shown best in FIG. 16. In addition to the above, the upper part 3 is formed in such a manner that the cross-pieces 48 and 49 are bounded on one side by a conically tapering insertion region 47.

Figure 17:
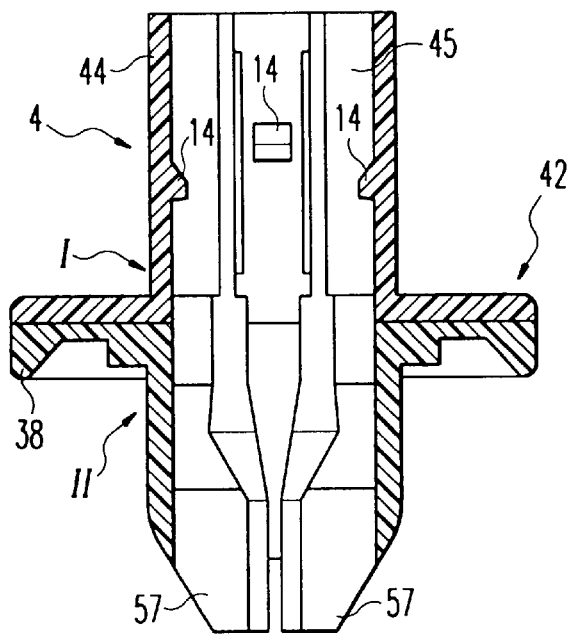
FIG. 17 is a cross-sectional view of the upper part of the adjustable connector system shown in FIG. 16.
Figure 18:
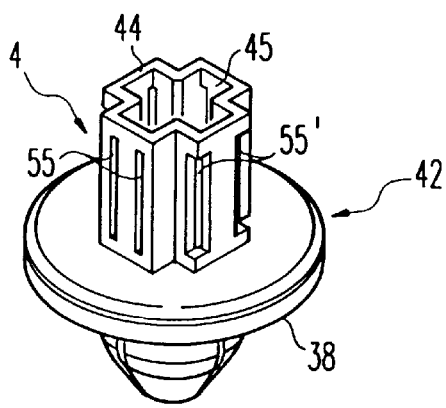
FIG. 18 is a perspective view of the lower part of the subject adjustable connector system adapted to engage the upper part illustrated in FIG. 16.

FIGS. 17 and 18 illustrate the lower portion 4 in detail. As shown there, the lower portion is adapted in cross-section to engage the upper part 3. The lower part if preferably formed of a two-component combination. A first region I consists of a hard material and includes a housing 44 having a recess 45, counter catches 14 and an upper part of a sealing flange 42. A second region II is formed integrally with the first region but of a second and softer material. The second region II includes a lower part of the sealing flange 42 and several spreader elements 57 separated from each other by means of slots.

As particularly shown in FIG. 18, the housing member 44 includes at least one longitudinally extending slot 55 or 55' connected with recess 45. In this arrangement, the slots 55 are disposed on at least one surface of the housing member 44 whereas the slots 55' extend over at least one lateral wall of the housing.

It is furthermore evident from FIG. 18 that the housing member 44 with its recess 45 is adapted in cross section to engage the intermediary region 5 of the upper part 3. That is, the housing member is adapted to accept the four cross-pieces 48 and 49.

Figure 16:
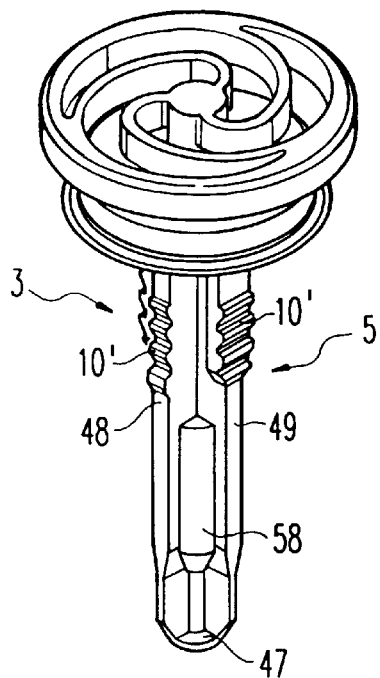
FIG. 16 is a perspective view showing the upper part of another preferred embodiment of the subject adjustable connector system formed in accordance with the present invention.
Figure 19:
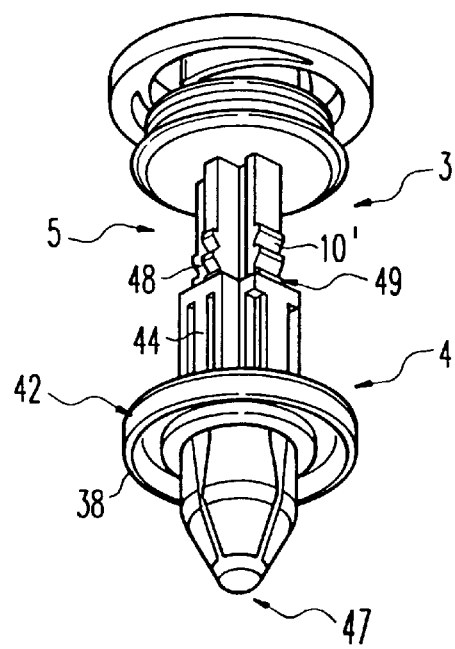
FIG. 19 is a perspective view of the upper and lower parts of the subject adjustable connector system illustrated in FIGS. 16–18 and shown in an interengaged relationship.

FIG. 19 is a perspective illustration of the adjustable connector system of the instant embodiment shown in a pre-mounted arrangement and consisting of an upper part 3 according to FIG. 16, and a lower part 4 formed in accordance with FIGS. 17 and 18.

Figure 20:
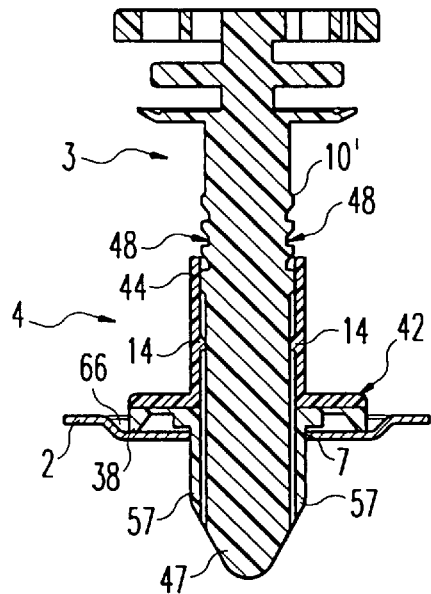
FIG. 20 is a center cross-sectional view taken through the upper part of the adjustable connector system illustrated in FIG. 19.

Turning to FIG. 20, the pre-mounted adjustable connector system can be installed in an opening 7 of an associated support 2. As an example, the support 2 can be equipped with a depression or groove 66. The lower region of the sealing flange 42 consists preferably of a softer material and has, in the embodiment illustrated, a circumferential sealing lip 38 which, according to FIG. 17, acts upon the surface of the depression 66 of the support member 2.

Figure 21:
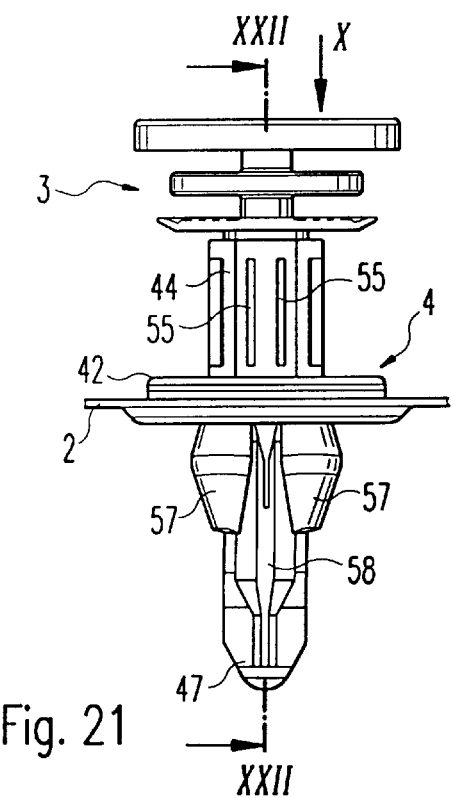
FIG. 21 is a lateral plan view of the adjustable connector system shown in FIGS. 16–20 illustrated in a final assembled position.
Figure 22:
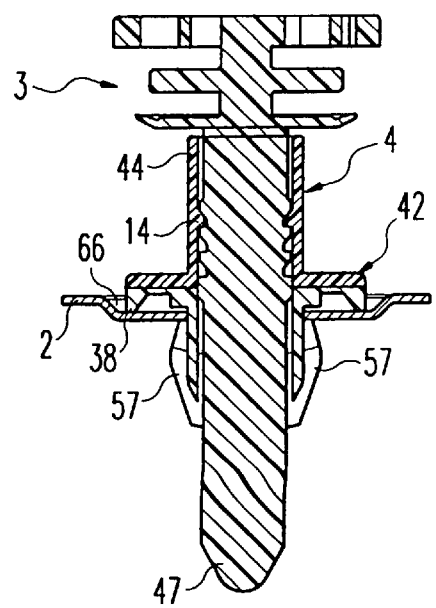
FIG. 22 is a cross-sectional view of the adjustable connector system taken along line XXII—XXII of FIG. 21.
Figure 26:
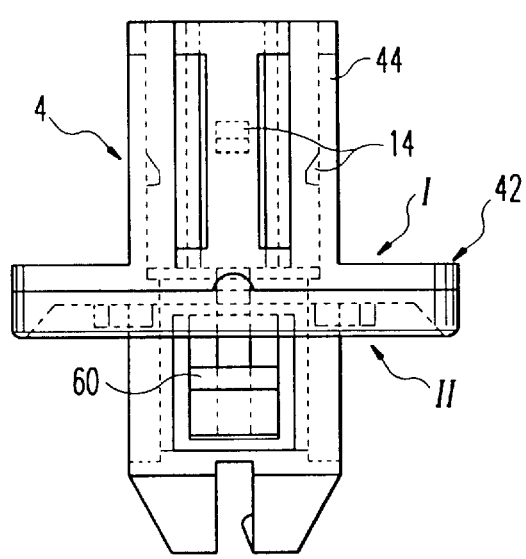
FIG. 26 is a lateral plan view of the lower part of the connector system shown in FIG. 25.
Figure 28:
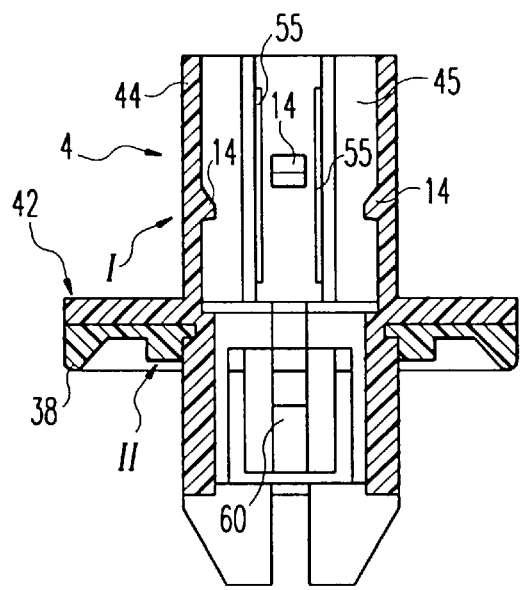
FIG. 28 is a cross-sectional view of the lower part of the connector system taken along line XXVIII—XXVIII of FIG. 25.

After the adjustable connector system is disposed in the arrangement illustrated in FIG. 20, pressure can be applied to the upper part 3 in the direction labeled X in FIG. 21. Pressure in the X direction causes the conically tapering insertion region 47 of the upper part 3 to press through the spreader elements 57 of the lower part 4 and spreads same out behind the support opening 7 as best shown in FIGS. 21 and 22. The spreading occurs by means of interaction between the cross-pieces 48 and 49 and the profile member 58. With the inward pressing operation, the counter catches 14 arranged at different heights in the recess 45 of the housing 44 lock into corresponding locking elements 10' at the outside of the upper part 3 and retain the thus positively joined unit according to FIG. 22 in a functionally secure manner in the opening of the support 2.

FIGS. 23 through 34 depict another alternative preferred embodiment of the present invention. As shown best in FIGS. 23 and 24, the upper part includes diagonally opposed cross-pieces 48' and 49' provided with locking elements 10'. A contraction region 53 is disposed beneath the cross-pieces 48' and 49'. A pair of opposing resilient catch stops 51 are disposed adjacent the contraction region 53 as shown. As shown a pair of opposing recesses 52 are provided in the contraction regions 53.

Figure 27:
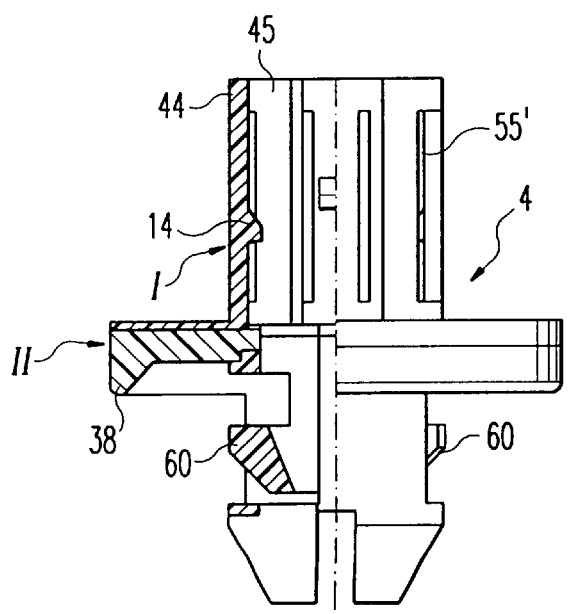
FIG. 27 is a cross-sectional view of the lower part taken along line XXVII—XXVII of FIG. 25.

FIGS. 25 through 28 illustrate the lower portion which, according to FIGS. 23 and 24, is adapted to engage the upper part 3. A housing member 44 is formed on a sealing flange and includes recesses 45 each provided with counter catches 14 on the inside as illustrated. Preferably, the counter catches are arranged at staggered heights best shown in FIGS. 27 and 28. Analogous to the aforementioned specific embodiment, the lower part 4 is preferably formed of a two-component part having a region I formed of a hard material and a region II formed of a softer second material. The region II formed of a second softer material includes the lower part of the sealing flange 42 and is provided with a circumferential sealing lip 38 as illustrated. The region I formed of the first harder material includes a lower zone which preferably extends through a support opening and has, as best shown in FIG. 27, catches 60 which are staggered relative to one another.

Figure 29:
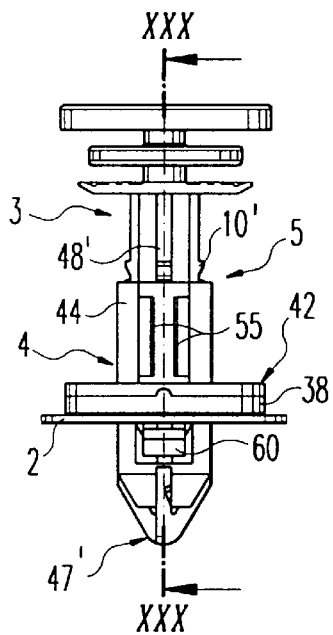
FIG. 29 is a lateral plan view illustrating the upper and lower parts of the connector system shown in FIGS. 23–28 illustrated in a position subsequent to installation within a support opening.
Figure 30:
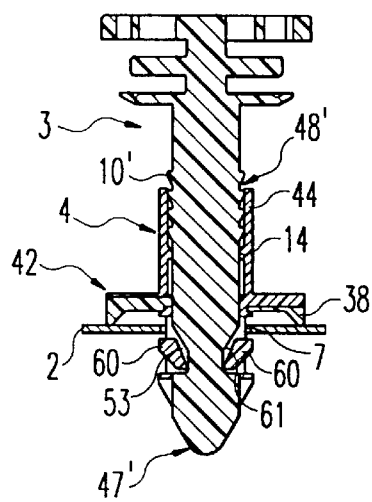
FIG. 30 is across-sectional view of the connector system taken along line XXX—XXX of FIG. 29.
Figure 31:
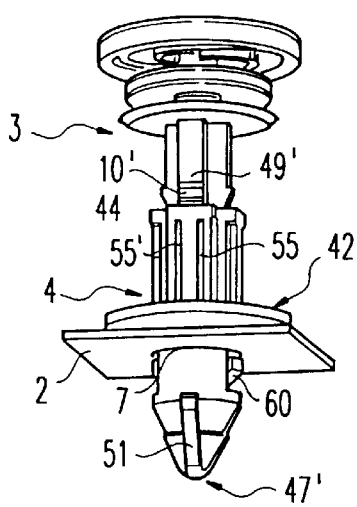
FIG. 31 is a perspective view of the adjustable connector system shown in FIGS. 29 and 30.

The unit comprising the upper part 3 and the lower part 4 is adapted to be installed into an opening 7 of an associated support 2 in a premounted form best illustrated in FIGS. 29–31. The catch members 60 of the lower portion 3 are not yet spread out in the position illustrated and embed themselves in the contraction region 53 in the anterior portion of the intermediary region 5. This orientation results in a pre-mounted configuration of the subject adjustable connector system.

Figure 32:
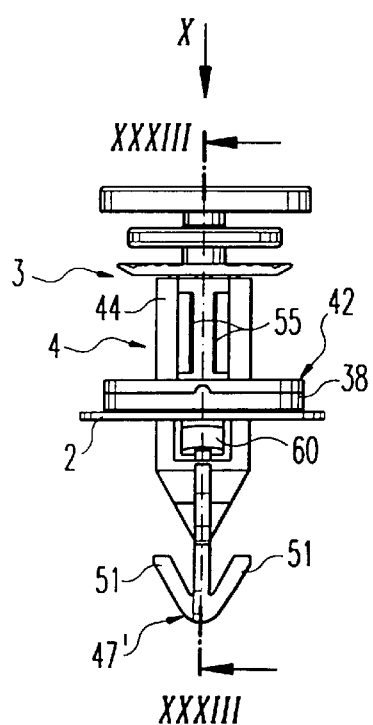
FIG. 32 is a lateral plan view of the connector assembly shown in FIGS. 29–31 and illustrated in a mounted final position.
Figure 33:
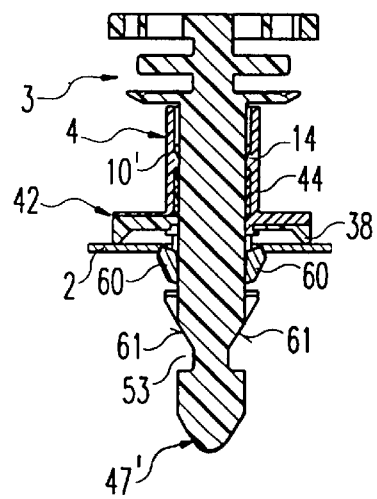
FIG. 33 is a cross-sectional view of the connector system taken along line XXXIII—XXXIII of FIG. 32.

Upon pressure exerted in the direction labeled X on the upper part 3 shown in FIG. 32, the catches 60 on the lower part 4 are operative to slide along the sloping surface 61 (FIGS. 23, 33) and experience, specifically as shown in FIG. 33, an expansion behind the support opening 7. The catches 60 are thus positioned behind the support opening and hold the entire connection according to the invention including the upper and lower parts 3, 4 in a functionally secure manner at the support 2.

Figure 34:
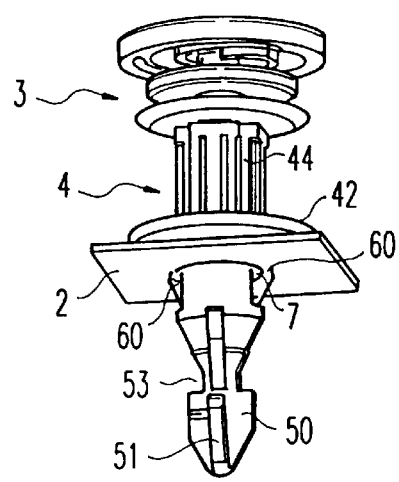
FIG. 34 is a perspective view of an assembled connector system disposed in an associated support opening and formed in accordance with the system illustrated in FIGS. 32 and 33.
Figure 35:
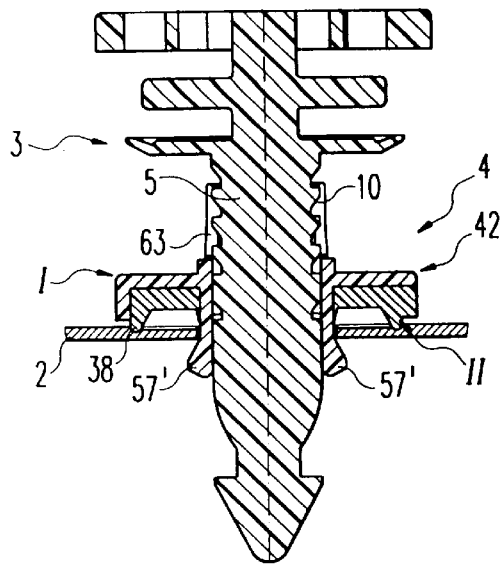
FIG. 35 is a cross-sectional view of another alternative preferred embodiment of the subject adjustable connector system illustrated after installation into an associated support opening.
Figure 36:
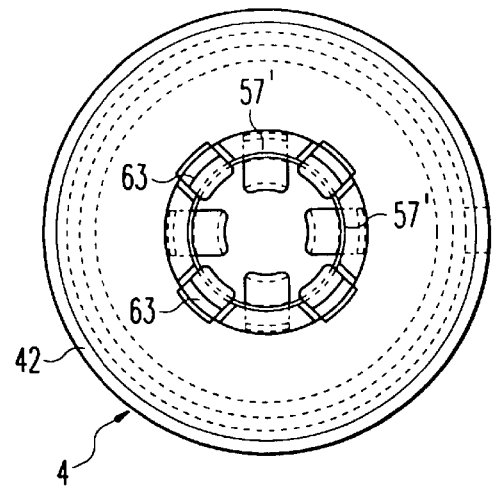
FIG. 36 is a top plan view of the connector system shown in FIG. 35.

As is apparent from FIGS. 32 and 34, the catch stops 51 lie free below the support 2 and may serve as an additional connection element for another part (not shown), or the like.

Because the counter-catches 14 of the recesses 45 of the housing member 44 embed themselves in the corresponding locking elements 10' of the upper part 3, a connected assembly of parts as a unit is advantageously created which is closed in itself and which is fastened on the support 2 in a functionally secure manner.

Figure 38:
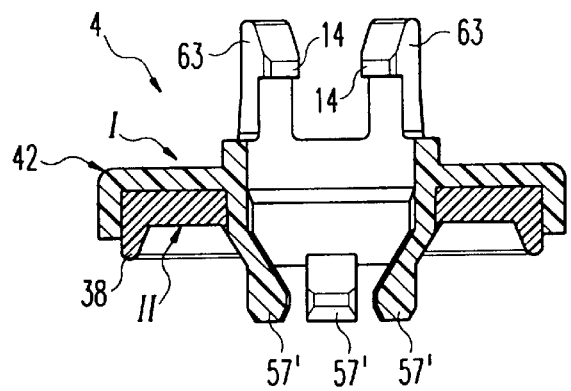
FIG. 38 is a cross-sectional view taken through the lower part illustrated in FIG. 37.
Figure 37:
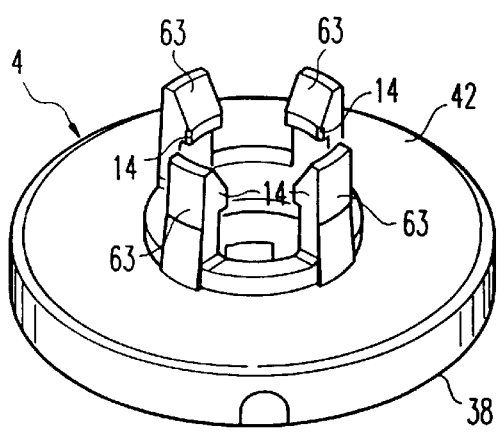
FIG. 37 is a perspective illustration of the lower part of the connector system illustrated in FIGS. 35 and 36.
Figure 39:
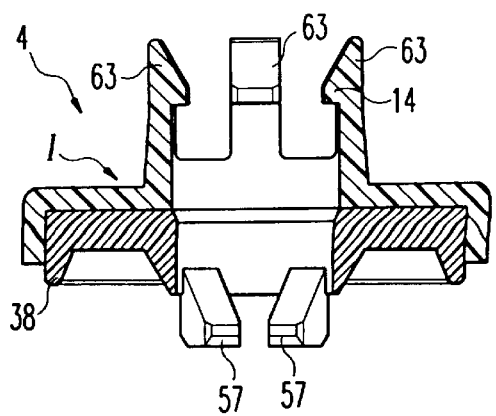
FIG. 39 is a cross-sectional view taken through the lower part illustrated in FIG. 36 shown in an alternative view.

Turning now to FIGS. 35–39, yet another alternative preferred embodiment of the invention is illustrated. As shown there, the lower part 4 includes several opposing resilient cross-pieces 63 disposed above the sealing flange 42 as best shown in FIGS. 37–39. The opposing resilient cross-pieces 63 are equipped with counter catches 14 on their inside surfaces.

The lower portion 4 is preferably formed from a two-component extrusion process to have a first region I made of a hard first material and a second region II made of a softer synthetic material. As is apparent from FIG. 35, the second region II made of a soft synthetic material forms the lower region of the sealing flange 42 and is preferably provided with a resilient sealing lip 38.

The lower region of the lower part 4 is preferably provided with several diagonally opposite resilient spreader elements 57' best shown in FIGS. 38 and 39. In this arrangement, the cross-pieces 63 are preferably staggered with the spreader elements 57' in a circumferential sense relative to the longitudinal axis formed by the lower part 4 and the intermediary region 5.

The upper part 3 is preferably formed as shown in FIG. 3 to have a cylindrical intermediary region 5 which is equipped with the locking elements 10. The upper part and the lower part are preferably used together to provide pre-mounted unit to be installed in a support opening 7. When pressure is applied on the upper part, the anterior part of the intermediary region 5 acts to spread the spreader elements 57 radially outwardly of the lower part to expand them. Thus, the connection according to the invention is well suited to fastening to a support member 2.

Figure 40:
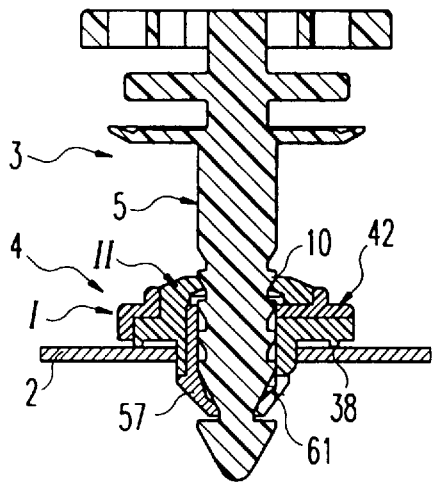
FIG. 40 is a cross-sectional view of another alternative preferred embodiment of the subject adjustable connector system shown in assembled form.
Figure 41:
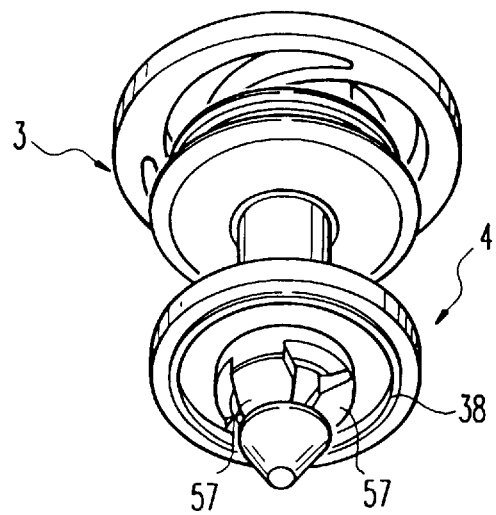
FIG. 41 is a perspective view of the connector system embodiment illustrated in FIG. 40; and, FIGS. 42a–42e each illustrate specific alternative preferred embodiments of the invention taken in center cross-section and each illustrate relative alternative embodiments of the upper part of the adjustable connector system.

FIGS. 40 and 41 show yet another alternative preferred embodiment of the invention. As shown there, the lower portion 4 includes a first region I made of a hard material and a second region II made of a softer material. The second region II defines a circumferential sealing lip 38. The first region I includes a plurality of spreader elements of the type described above in connection with the aforementioned alternative preferred embodiments. The spreader elements are adapted to be spread radially outwardly by engagement with a corresponding sloping surface 61 provided on the anterior zone of the intermediary region 5 after insertion of same in the opening 7 of the support 2.

Figure 42A:
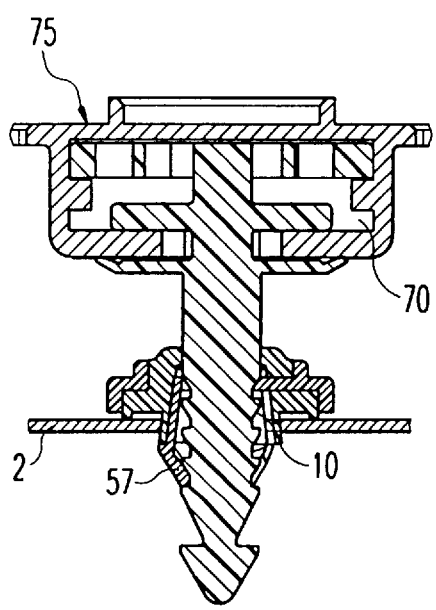

All of the above-mentioned preferred embodiments of the connection according to the invention have in common that the upper part 3 above the intermediary region 5 includes three flanges arranged at a distance from each other. Thus, according to FIG. 42a, a lateral insertion can take place into a pocket 70 of an associated part 75. Another part (not shown) can be arranged above the first part.

Figure 42B:
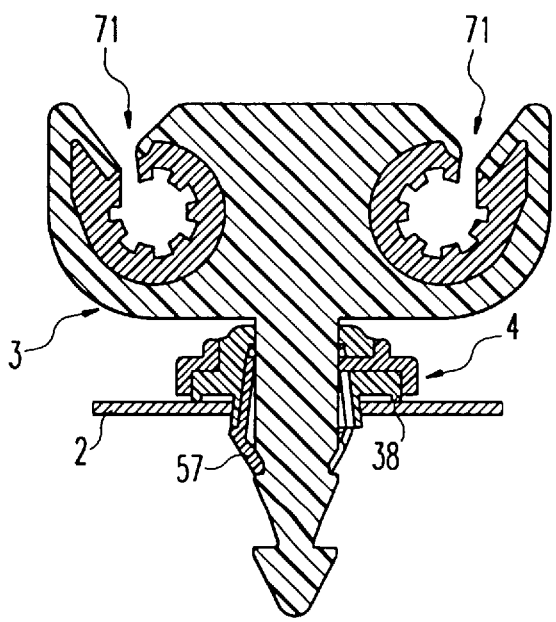

According to FIG. 42b, the upper portion 3 is provided with three flanges arranged at a distance from each other, and also a pair of pipe holding devices of well-known construction, arranged at a relative distance spaced apart parallel to each other.

Figure 42C:
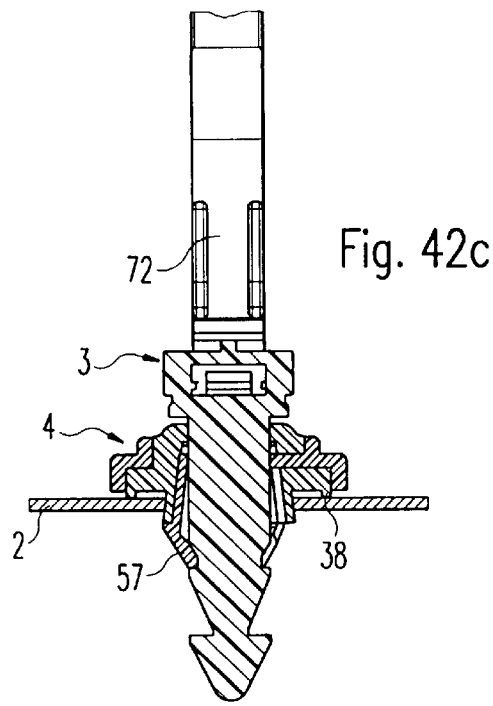

As shown in FIG. 42c, the upper part is provided with a looping strap 72 for adapting the subject adjustable connector system for looping around a plurality of pipelines (not shown), or the like.

Figure 42D:
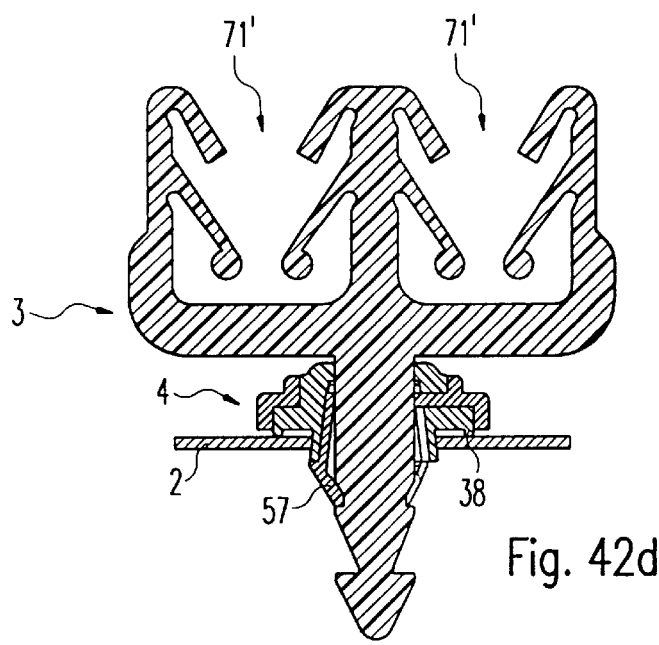

In FIG. 42d, a plurality of pipe fastening devices of different designs 71' are formed on the upper portion 3 in order to adapt the subject adjustable connector system for connecting pipes or the like to a support member.

Figure 42E:
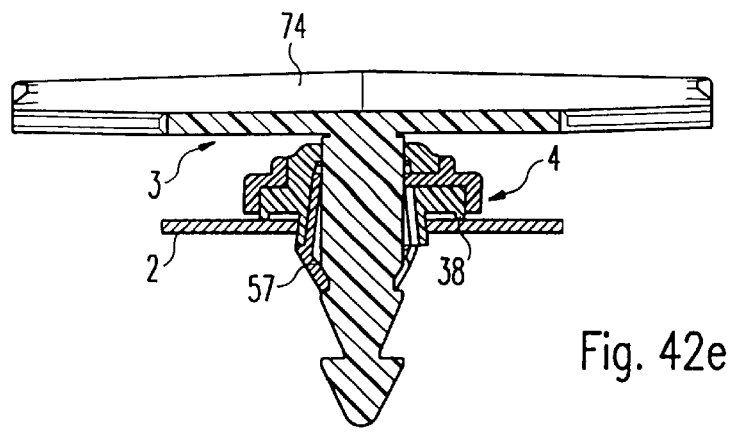

In the construction illustrated in FIG. 42e, the upper part is provided with a dish-shaped longitudinal recess 74 so that one or more pipe-like devices (not shown) can be positioned approximately parallel to the surface of the support member 2. The operatively associated pipelike members can then be fastened using one or more cable straps (not shown), or other suitable straplike members.

Overall, in accordance with the plurality of alternative preferred embodiments of the invention, a simple yet effective connection is provided between a support 2, specifically a body part of a motor vehicle and plate element, specifically a door covering of a motor vehicle. Effective sealing of the support opening is provided by the subject connector system. In addition, an excellent tolerance compensation in the Y direction is ensured extending over a large region, specifically with respect to a motor vehicle.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. An adjustable connector system for holding an associated plate element in a spaced-apart relationship relative to an associated support member, the adjustable connector system comprising:

an engagement member adapted for selective embedded engagement within a support opening formed in the associated support member, the engagement member defining a central opening and further being adapted on a first end to spread open and engage a back side surface of the associated support member, the engagement member being formed as a two-component piece and including a holding element made of a first hard material and an embedding element made of a second soft material;

at least one counter-locking unit carried on said holding element to extend radially inwardly into said central opening, the at least one counter-locking unit being formed of said first hard material a first connector member having an upper piece and a lower piece, the first connector member defining a neck-shaped intermediary region adapted to be received in the central opening of the engagement member; and, a plurality of locking elements disposed on the neck-shaped intermediary region to selectively lockingly engage the at least one counter-locking unit when the first connector member is received in the central opening of the engagement member, the plurality of locking elements being cooperative with the engagement member to spread apart the first end of the engagement member into engagement with the back side surface of the associated support member when the first connector member is selectively received in the engagement member.

2. The adjustable connector system according to claim 2 wherein said lower piece of said connector member is formed from a first hard material and a second soft material, the second soft material defining a circumferential sealing lip.

3. The adjustable connector system according to claim 2 wherein said upper piece of said intermediary region includes at least one of a pipe fastening device, a cable clamping region, and a panel holding element.

4. The adjustable connector system according to claim 2 wherein said neck-shaped intermediary region includes, on a first end thereof:

at least two resilient guidance wings carried on a cylindrical member extending from the first end of the neck-shaped intermediary region; and, a cone-shaped surface disposed between the cylindrical member and the plurality of locking elements formed on the intermediary region, the cone-shaped surface being adapted to engage an interior wall of said engagement member.

5. The adjustable connector system according to claim 2 wherein:

the upper piece of the neck-shaped intermediary region includes a plurality of radially extending cross-piece members formed along the longitudinal axis of the intermediary region, each of the plurality of radially extending cross-piece members carrying a set of said plurality of locking elements; and, the upper piece of the neck-shaped intermediary region includes a sealing flange carrying a housing member, the housing member defining a recess having a shape in cross section adapted to receive the plurality of radially extending cross-piece members formed on the upper piece of the intermediary region, the housing member carrying at least one counter catch member operative for selective engagement with said plurality of locking elements carried on the plurality of radially extending cross-piece members of the upper piece to selectively fasten the intermediary region to the sealing flange.

6. The adjustable connector system according to claim 2 wherein said holding element is adapted for partial embedded engagement with said embedding element.

7. The adjustable connector system according to claim 3 wherein said holding element is ring-shaped, the holding element having a first portion being at least partially embedded within said embedding element, and a second portion extending from the embedding element and forming said at least counter-locking unit.

8. The adjustable connector system according to claim 3 wherein said holding element includes at least one cross-piece member extending into said embedding element.

9. The adjustable connector system according to claim 4 wherein said holding element includes:

four cross-piece members extending into said embedding element each of the four cross-piece members facing a respective other one of the four cross-piece members; and, a set of cross-shaped embedded end regions extending between the four cross-piece members and carrying said at least two counter-locking units.

10. The adjustable connector system according to claim 6 wherein:

each of the set of embedded end regions defines a cross-beam member; and, said at least two counter-locking units are carried at least two of said cross-beam members.

11. The adjustable connector system according to claim 2 wherein said holding element defines a circumferential internal recess adapted to receive said embedded element.

12. The adjustable connector system according to claim 10 wherein said at least one counter-locking unit is disposed on said holding element adjacent said circumferential internal recess.

13. The adjustable connector system according to claim 11 wherein said at least one counter-locking unit are carried on at least one cross-piece member.

14. The adjustable connector system according to claim 10 wherein said embedding element includes:

a ring-shaped member disposed in said circumferential internal recess; and, a spreader element adapted to engage said first connector member.

15. The adjustable connector system according to claim 13 wherein said spreader element has an annular shape.

16. The adjustable connector system according to claim 14 wherein said intermediary region includes a groove adapted to receive said spreader element prior to selective connection of said adjustable connector system with said associated support member.

17. The adjustable connector system according to claim 10 wherein said circumferential internal recess of said holding element is substantially formed in the shape of an inverted U and defines a leg member adapted to extend through said support opening.

18. The adjustable connector system according to claim 16 wherein a first end of said leg member and said spreader element are adapted to embeddedly engage said groove formed in said intermediary region.

19. The adjustable connector system according to claim 17 wherein said spreader element includes a circumferential recess adapted to receive said leg member.

20. The adjustable connector system according to claim 10 wherein said neck-shaped intermediary region defines a guidance cone member adjacent said groove.

21. The adjustable connector system according to claim 19 wherein said guidance cone member has a T-shape in cross-section.

22. An adjustable connector system for holding an associated plate element in a spaced-apart relationship relative to an associated support member, the adjustable connector system comprising:

an engagement member adapted for selective embedded engagement in a support opening formed in an associated support member, the engagement member defining a central opening and further being adapted on a first end to spread open and engage a back side surface of the associated support member;

at least one counter-locking unit formed on the engagement member and extending radially inwardly into said central opening;

a first connector member having an upper piece and a lower piece, the first connector member defining a neck-shaped intermediary region adapted to be received in the central opening of the engagement member; and, a plurality of locking elements disposed on the neck-shaped intermediary region to selectively lockingly engage the at least one counter-locking unit when the first connector member is received in the central opening of the engagement member, the plurality of locking elements being cooperative with the engagement member to spread apart the first end of the engagement member into engagement with the back side surface of the associated support member when the first connector member is selectively received in the engagement member, said neck-shaped intermediary region including, on a first end thereof: at least two resilient guidance wings carried on a cylindrical member extending from the first end of the neck-shaped intermediary region; and, a cone-shaped surface disposed between the cylindrical member and the plurality of locking elements formed on the intermediary region, the cone-shaped surface being adapted to engage an interior wall of said engagement member.

23. The adjustable connector system according to claim 8 wherein said at least two resilient guidance wings extend radially outwardly away from said elongate neck-shaped intermediary region and beyond said engagement member.

24. The adjustable connector system according to claim 8 wherein:

said engagement member comprises a two-component piece and includes a holding element made of a first hard material and an embedding element made of a second soft material; and, said at least one counter-locking unit is disposed at said holding element and is made of said first hard material.

25. The adjustable connector system according to claim 8 wherein:

the upper piece of the neck-shaped intermediary region includes a plurality of radially extending cross-piece members formed along the longitudinal axis of the intermediary region, each of the plurality of radially extending cross-piece members carrying a set of said plurality of locking elements; and, the upper piece of the neck-shaped intermediary region includes a sealing flange carrying a housing member, the housing member defining a recess having a shape in cross section adapted to receive the plurality of radially extending cross-piece members formed on the upper piece of the intermediary region, the housing member carrying at least one counter catch member operative for selective engagement with said plurality of locking elements carried on the plurality of radially extending cross-piece members of the upper piece to selectively fasten the intermediary region to the sealing flange.

26. An adjustable connector system for holding an associated plate element in a spaced-apart relationship relative to an associated support member, the adjustable connector system comprising:

an engagement member adapted for embedded engagement with a support opening formed in an associated support member, the engagement member defining a central opening and further being adapted on a first end to spread open and engage a back side surface of the associated support member;

at least one counter-locking unit formed on the engagement member and extending radially inwardly into said central opening;

a first connector member having an upper piece and a lower piece, the first connector member defining a neck-shaped intermediary region adapted to be received in the central opening of the engagement member; and, a plurality of locking elements disposed on the neck-shaped intermediary region to selectively lockingly engage the at least one counter-locking unit when the first connector member is received in the central opening of the engagement member, the plurality of locking elements being cooperative with the engagement member to spread apart the first end of the engagement member into engagement with the back side surface of the associated support member when the first connector member is selectively received in the engagement member, the upper piece of the first connector member including a plurality of radially extending cross-piece members formed along the longitudinal axis of the intermediary region, each of the plurality of radially extending cross-piece members carrying a set of said plurality of locking elements; and, the lower piece of the first connector member including a sealing flange carrying a housing member, the housing member defining a recess having a shape in cross section adapted to receive the plurality of radially extending cross-piece members formed on the upper piece of the first connector member, the housing member carrying at least one counter catch member operative for selective engagement with said plurality of locking elements carried on the plurality of radially extending cross-piece members of the upper piece to selectively fasten the intermediary region to the sealing flange.

27. The adjustable connector system according to claim 21 wherein said plurality of radially extending cross-piece members have a cross-shaped cross-section and wherein each of said plurality of cross-piece members are arranged at opposite diagonal positions relative to another one of the plurality of cross-piece members.

28. The adjustable connector system according to claim 22 wherein:
   each of said plurality of radially extending cross-piece members have different widths; and,
   said recess has a shape in cross section adapted to receive said plurality of radially extending cross-piece members having said different widths.

29. The adjustable connector system according to claim 23 wherein said plurality of locking elements are disposed on each of said plurality of radially extending cross-piece members in a spaced apart relationship along a longitudinal axis of said neck-shaped intermediary region.

30. The adjustable connector system according to claim 24 wherein:
   at least two of said plurality of cross-piece members extend in opposite radial directions, said at least two cross-piece members having different widths; and,
   each of said at least two cross-piece members extending in said opposite radial directions carry a respective set of locking elements having respective different widths formed in accordance with said respective different widths of said oppositely radially extending cross-piece members.

31. The adjustable connector system according to claim 25 wherein:
   said neck-shaped intermediary region forms a conically tapering insertion region on a first end thereof; and,
   said plurality of cross-piece members are bounded on their respective ends by said conically tapering insertion region.

32. The adjustable connector system according to claim 26 wherein said insertion region carries at least two resilient catch lugs extending in opposite diagonal directions from the intermediary region.

33. The adjustable connector system according to claim 27 wherein said first end of the neck-shaped intermediary region includes at least one recess formed between said at least resilient catch lugs and said plurality of radially extending cross-piece members, said at least one recess being adapted to receive first ends of said resilient catch lugs when the catch lugs are deflected radially inwardly.

34. The adjustable connector system according to claim 28 wherein the neck-shaped intermediary region includes a narrowed contraction region disposed between said plurality of cross-piece members, and said conically tapering insertion region.

35. The adjustable connector system according to claim 29 wherein the adjustable connector system includes a first region formed of a first hard material and a second region formed of a second soft material, the first region of the adjustable connector system including a set of cross-pieces, an upper part of said sealing flange and said spreader elements and said second region including a lower part of said sealing flange.

36. The adjustable connector system according to claim 30 wherein said set of cross-pieces are disposed along a longitudinal axis defined by said spreader elements and said intermediary region and are spaced apart circumferentially about said longitudinal axis.

37. The adjustable connector system according to claim 21 wherein said housing member carries a plurality of counter catches, each of the plurality of counter catch members being disposed on the housing member in a staggered location relative to said sealing flange.

38. The adjustable connector system according to claim 32 wherein said housing member includes at least one longitudinally extending slot formed in said housing member contiguous with said recess.

39. The adjustable connector system according to claim 33 wherein said housing member includes a plurality of longitudinally extending slots extending over at least a one of a surface and a lateral edge of said housing member.

40. The adjustable connector system according to claim 34 wherein:
   said lower piece is a two-component part including a first region formed of a first hard material defining said housing member and a second region formed of a second soft material defining a lower part of said sealing flange whereby said spreader elements are adapted to selectively extend through said support opening, whereby the spreader elements are adapted to be spread radially outwardly behind said support opening through selective engagement with said intermediary region of said upper piece.

41. The adjustable connector system according to claim 35 wherein said intermediary region includes a plurality of profile members defined between said plurality of crosspieces, said profile members being adapted to act upon and widen radially outwardly said spreader elements to selectively engage behind said support opening.

42. The adjustable connector system according to claim 36 wherein:
   said second region includes at least two catches disposed adjacent said sealing flange, said at least two catches being selectively embeddable in the contraction region of said intermediary region; and,
   the at least two catches are adapted to engage behind said support opening subsequent to selective insertion movement of said upper piece into said lower piece urging radially outwardly spreading motion of said at least two catches above said contraction region by engagement of sloping surfaces formed on said intermediary region.

43. The adjustable connector system according to claim 37 wherein said lower piece includes a plurality of opposing cross-pieces adjacent said sealing flange, each of said plurality of opposing cross-pieces being provided with at least one counter catch said at least one counter catch being adapted to establish contact with said plurality of locking elements of said intermediary region.

44. The adjustable connector system according to claim 38 wherein a lower part of said sealing flange includes a circumferential sealing lip disposed at an outer circumference of said sealing flange.

45. The adjustable connector system according to claim 21 wherein:
   said engagement member comprises a two-component piece and includes a holding element made of a first hard material and an embedding element made of a second soft material; and,
   said at least one counter-locking unit is disposed at said holding element and is made of said first hard material.

46. The adjustable connector system according to claim 21 wherein said neck-shaped intermediary region includes, on a first end thereof:
   at least two resilient guidance wings carried on a cylindrical member extending from the first end of the neck-shaped intermediary region; and,
   a cone-shaped surface disposed between the cylindrical member and the plurality of locking elements formed on the intermediary region, the cone-shaped surface being adapted to engage an interior wall of said engagement member.

47. A connector apparatus for use in holding a plate element in a spaced-apart relationship relative to a support member, the connector apparatus comprising:

an engagement member adapted for embedded engagement in a support opening defined by an associated support member, the engagement member having a central opening and including a holding element made of a first hard material and an embedding element made of a second soft material, the embedding element being adapted to spread open and engage a back side surface of the associated support member;

at least one counter-locking unit carried on the holding element and extending radially inwardly into said central opening;

a first connector member having a first end, a second end, and a neck-shaped intermediary region between the first and second ends, the neck-shaped intermediary region being adapted to be received in the central opening of the engagement member; and, a plurality of locking elements on the neck-shaped intermediary region to selectively lockingly engage the at least one counter-locking unit when the first connector member is received in the central opening of the engagement member, the plurality of locking elements being cooperative with the engagement member to spread the embedding member open into engagement with said back side surface of the associated support member when the first connector member is selectively received in the engagement member.

48. The connector apparatus according to claim 47 wherein said first connector member includes, on said first end thereof:

at least two resilient guidance wings carried on a cylindrical member extending from the first end of the first connector member; and, a cone-shaped surface disposed between the cylindrical member and the plurality of locking elements formed on the intermediary region of the first connector member, the cone-shaped surface being adapted to engage an interior wall of said engagement member.

49. The connector apparatus according to claim 48 wherein:

the second end of the first connector member includes a plurality of radially extending cross-piece members formed along the longitudinal axis of the intermediary region, each of the plurality of radially extending cross-piece members carrying a set of said plurality of locking elements; and, the first end of the first connector member includes a sealing flange carrying a housing member, the housing member defining a recess having a shape in cross section adapted to receive the plurality of radially extending cross-piece members formed on the second end of the first connector member, the housing member carrying at least one counter catch member operative for selective engagement with said plurality of locking elements carried on the plurality of radially extending cross-piece members of the second end to selectively fasten the intermediary region to the sealing flange.

* * * * *